United States Patent
Persons et al.

(10) Patent No.: US 12,528,426 B2
(45) Date of Patent: Jan. 20, 2026

(54) WIRE HARNESS DEVICE

(71) Applicants: Julius Persons, Lafayette, LA (US);
Brett Blanchet, Lafayette, LA (US);
Cory Short, Lafayette, LA (US)

(72) Inventors: Julius Persons, Lafayette, LA (US);
Brett Blanchet, Lafayette, LA (US);
Cory Short, Lafayette, LA (US)

(*) Notice: Subject to any disclaimer, the term of this patent is extended or adjusted under 35 U.S.C. 154(b) by 142 days.

(21) Appl. No.: 18/632,025

(22) Filed: Apr. 10, 2024

(65) Prior Publication Data
US 2025/0319828 A1 Oct. 16, 2025

(51) Int. Cl.
*B60R 16/02* (2006.01)
*B60R 16/023* (2006.01)
*H01R 12/61* (2011.01)
*H01R 13/66* (2006.01)
*H01R 27/02* (2006.01)
*H01R 31/06* (2006.01)

(52) U.S. Cl.
CPC ...... *B60R 16/0207* (2013.01); *B60R 16/0234* (2013.01); *H01R 12/613* (2013.01); *H01R 13/6616* (2013.01); *H01R 27/02* (2013.01); *H01R 31/06* (2013.01); *H01R 2201/26* (2013.01)

(58) Field of Classification Search
CPC ............ B60R 16/0207; B60R 16/0234; H01R 12/613
See application file for complete search history.

(56) References Cited

U.S. PATENT DOCUMENTS

| | | | |
|---|---|---|---|
| 5,446,389 | A | 8/1995 | Lenz |
| 7,350,159 | B2 | 3/2008 | Cancilla |
| 7,447,574 | B1 | 11/2008 | Washicko |
| 8,494,705 | B1 | 7/2013 | Evans, Jr. |
| 2004/0116824 | A1 | 6/2004 | Hirt |
| 2022/0306050 | A1 | 9/2022 | Rich |

FOREIGN PATENT DOCUMENTS

CA 2443478 11/2002

*Primary Examiner* — Paresh Paghadal

(57) ABSTRACT

A wire harness device for connecting a diagnostic computer to a variety of engine control modules includes a ribbon cable. A power connection port is electrically coupled to the ribbon cable. A service tool connection port is electrically coupled to the ribbon cable to connect a diagnostic computer. A plurality of adaptor plugs is electrically couplable to the ribbon cable. Each adaptor plug includes an associated engine control module plug to connect an associated engine control module and to facilitate communication between the engine control module and the diagnostic computer. An adaptor port is electrically coupled to the ribbon cable to receive the adaptor plug. A pair of terminating resistor plugs is electrically couplable to the ribbon cable to absorb a voltage travelling through the ribbon cable. A pair of terminating resistor ports is electrically coupled to the ribbon cable to receive the pair of terminating resistor plugs.

13 Claims, 8 Drawing Sheets

WIRE HARNESS DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to diesel engine troubleshooting kits and more particularly pertains to a new diesel engine troubleshooting kit for connecting a diagnostic computer to a variety of engine control modules.

(2) Description of Related Art Including Information Disclosed Under 37 CFR 1.97 and 1.98

The prior art relates to diesel engine troubleshooting kits. Mechanics often use a wire harness to troubleshoot, diagnose, and flash program engine control modules within a vehicle. However, each engine control module has a specific plug for the wire harness, requiring mechanics to use a vast array of harnesses. This problem is even more pronounced for diesel engine repair because diesel engines often include multiple engine control modules within a single vehicle, each having a unique plug. Thus, there is a need in the art for a single wire harness device that can be used to connect a diagnostic computer to any engine control module, regardless of the shape or configuration of the engine control module plug.

BRIEF SUMMARY OF THE INVENTION

An embodiment of the disclosure meets the needs presented above by generally comprising a ribbon cable. A power connection port is electrically coupled to the ribbon cable. The power connection port is configured to be electrically couplable to a power source. A service tool connection port is electrically coupled to the ribbon cable. The service tool connection port is configured to be electrically couplable to a diagnostic computer. A plurality of adaptor plugs is electrically couplable to the ribbon cable. Each adaptor plug of the plurality of adaptor plugs comprises a 12-pin plug that is electrically coupled to an associated engine control module plug wherein the plurality of adaptor plugs is configured to be electrically couplable to an associated engine control module of a plurality of engine control modules whereby the ribbon cable is configured to facilitate communication between the plurality of engine control modules and the diagnostic computer. An adaptor port is electrically coupled to the ribbon cable. An adaptor plug of the plurality of adaptor plugs is selectively positionable within the adaptor port to electrically couple the adaptor plug of the plurality of adaptor plugs to the ribbon cable. The adaptor port comprises a 12-pin connector. A pair of terminating resistor plugs is electrically couplable to the ribbon cable wherein the pair of terminating resistor plugs is configured to absorb a voltage travelling through the ribbon cable to inhibit the voltage from re-circulating through the ribbon cable. A pair of terminating resistor ports is electrically coupled to the ribbon cable. Each terminating resistor plug of the pair of terminating resistor plugs is positionable within an associated terminating resistor port of the pair of terminating resistor ports to electrically couple each terminating resistor plug to the ribbon cable.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
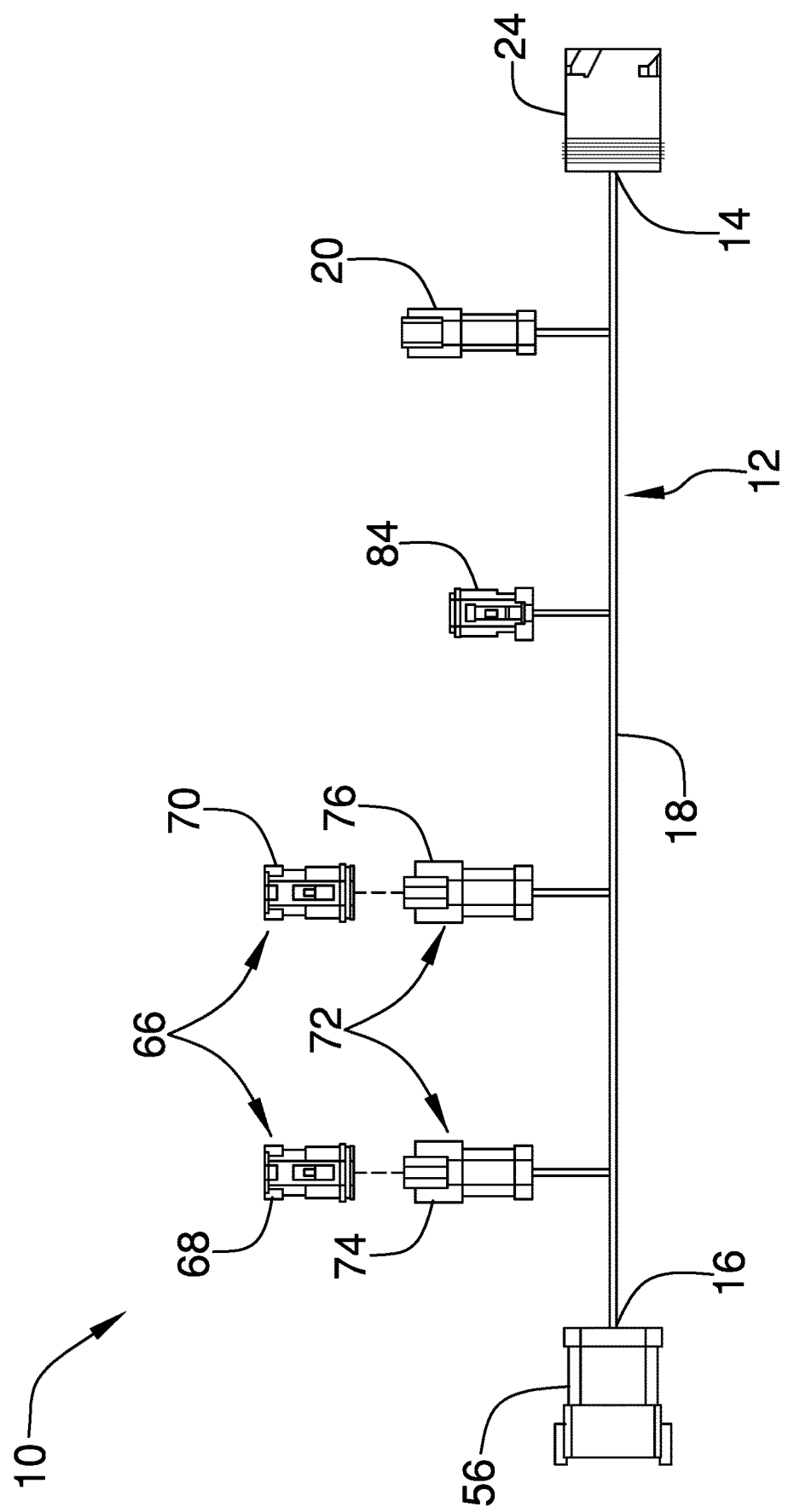
FIG. 1 is a top view of a wire harness device according to an embodiment of the disclosure.

With reference now to the drawings, and in particular to FIGS. 1 through 8 thereof, a new diesel engine troubleshooting kit embodying the principles and concepts of an embodiment of the disclosure and generally designated by the reference numeral 10 will be described.

As best illustrated in FIGS. 1 through 8, the wire harness device 10 generally comprises a ribbon cable 12. The ribbon cable 12 generally has a first terminal end 14, a second terminal end 16, and an elongated body 18 that extends between the first terminal end 14 and the second terminal end 16.

A power connection port 20 is electrically coupled to the ribbon cable 12. The power connection port 20 is configured to be electrically couplable to a power source 22. The power connection port 20 is generally a 3-pin connector wherein the power connection port 20 is configured to receive one of a 2-pin plug and a 3-pin plug from the power source 22. In embodiments according to FIGS. 1 and 2, the power connection port 20 may extend upwardly from the elongated body 18 of the ribbon cable 12. For example, the power connection port 20 may be positioned proximate to the second terminal end 16.

Figure 2:
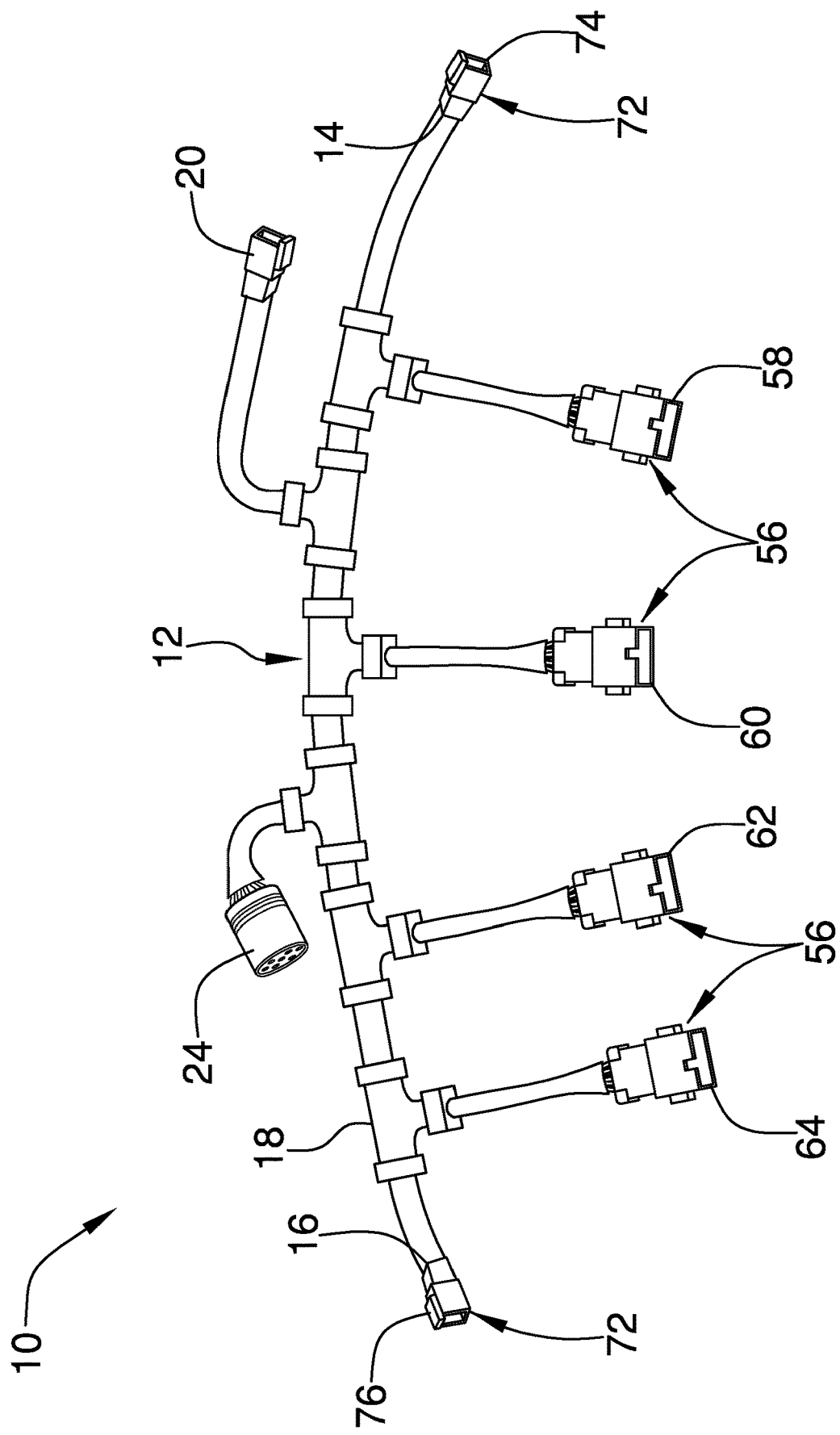
FIG. 2 is a front isometric view of an embodiment of the disclosure.
Figure 3:
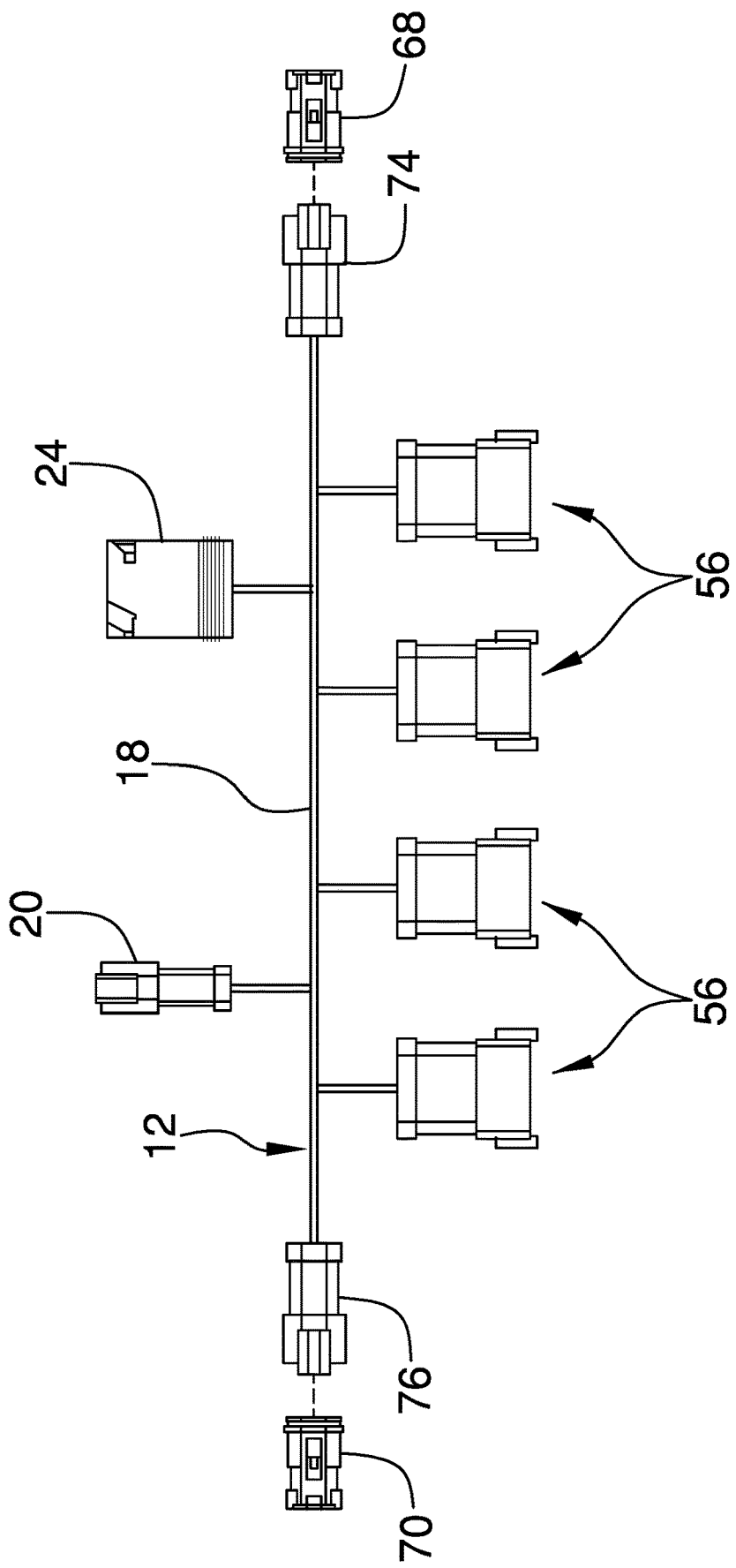
FIG. 3 is a top view of an embodiment of the disclosure.
Figure 4:
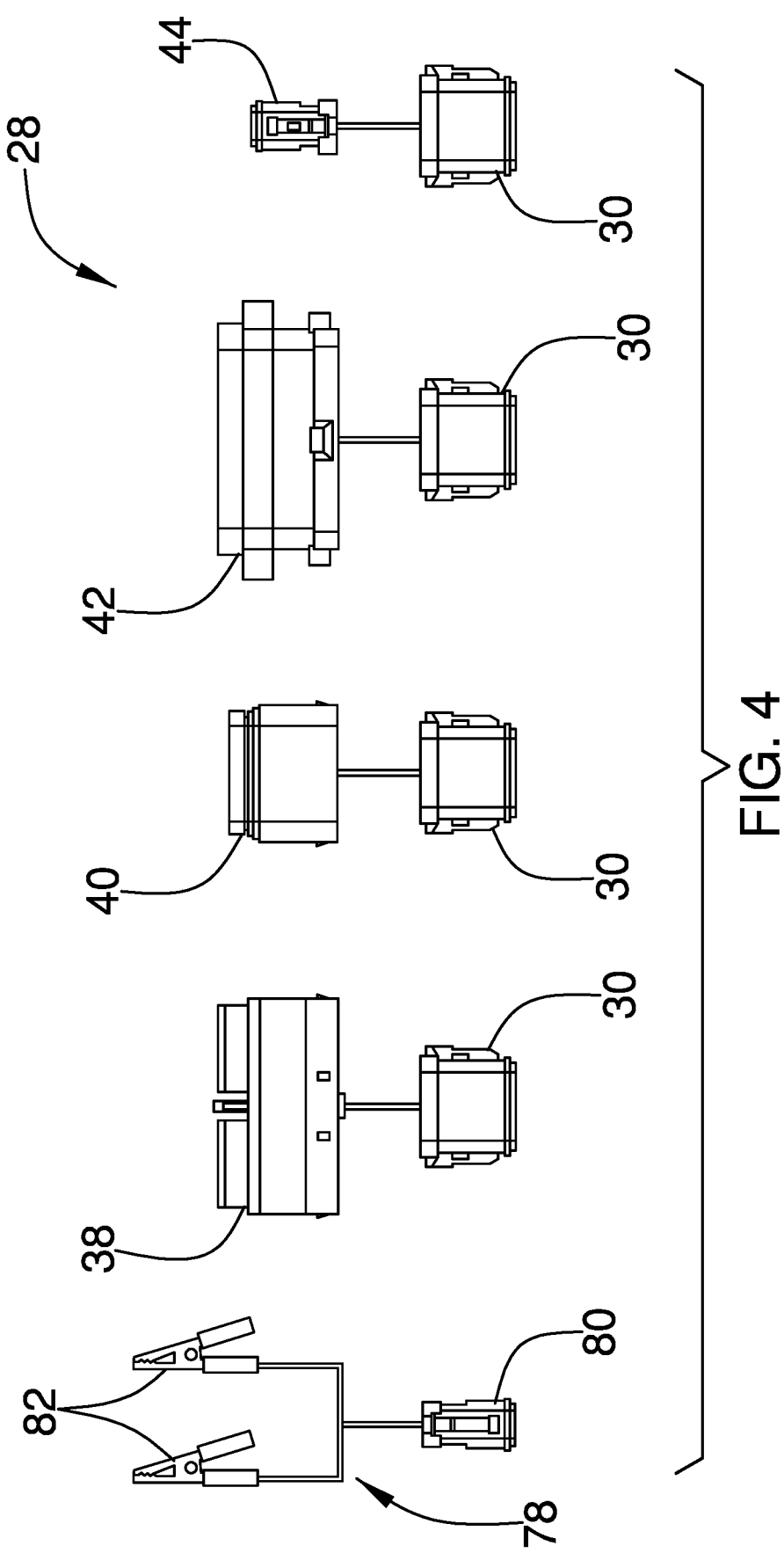
FIG. 4 is a top view of an embodiment of the disclosure.
Figure 5:
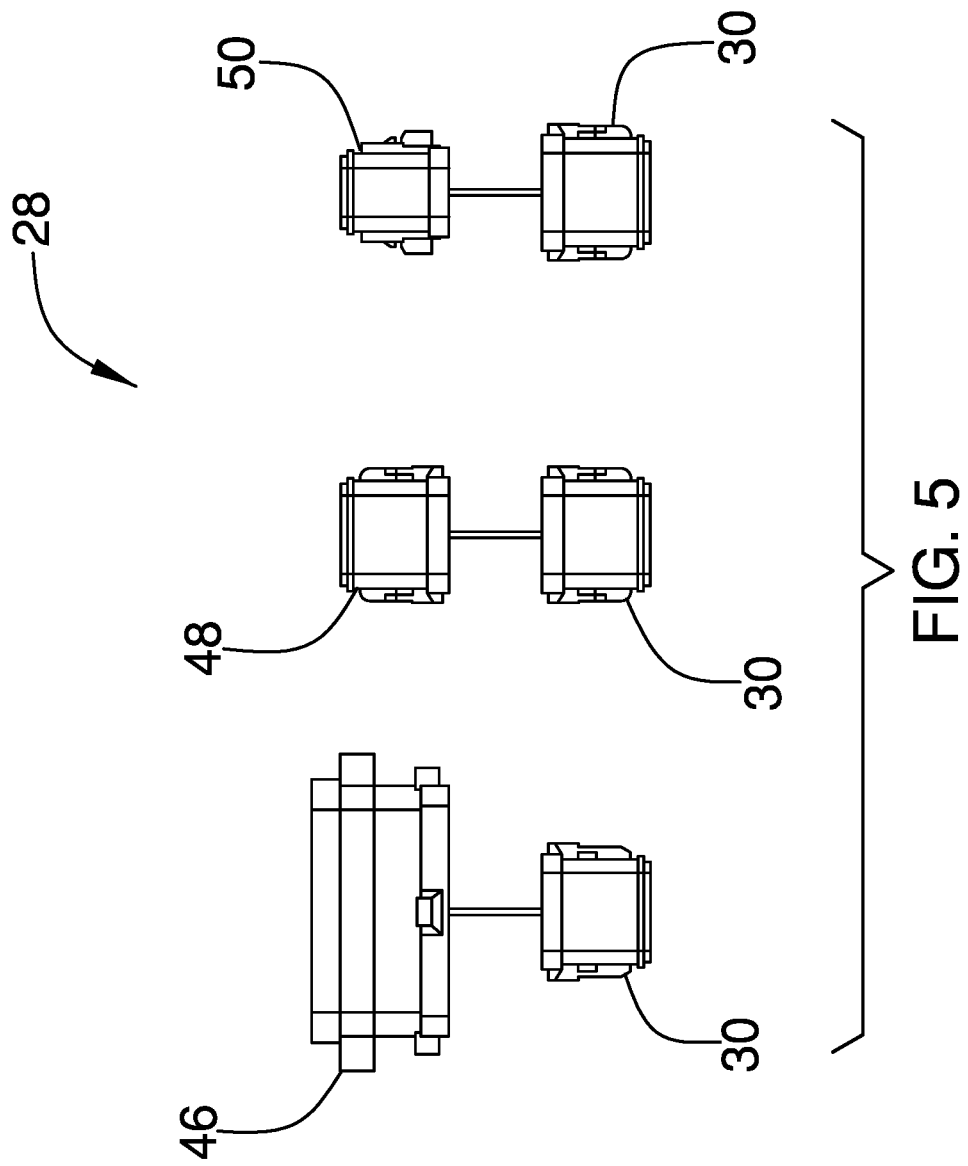
FIG. 5 is a top view of an embodiment of the disclosure.
Figure 6:
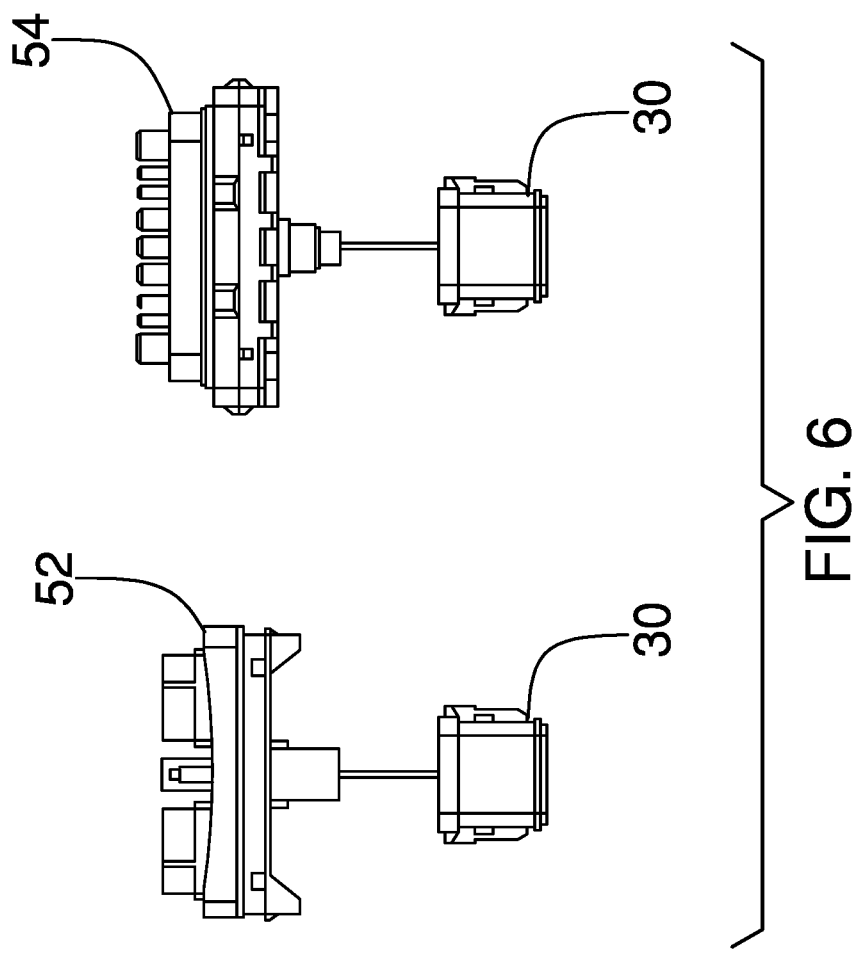
FIG. 6 is a top view of an embodiment of the disclosure.
Figure 7:
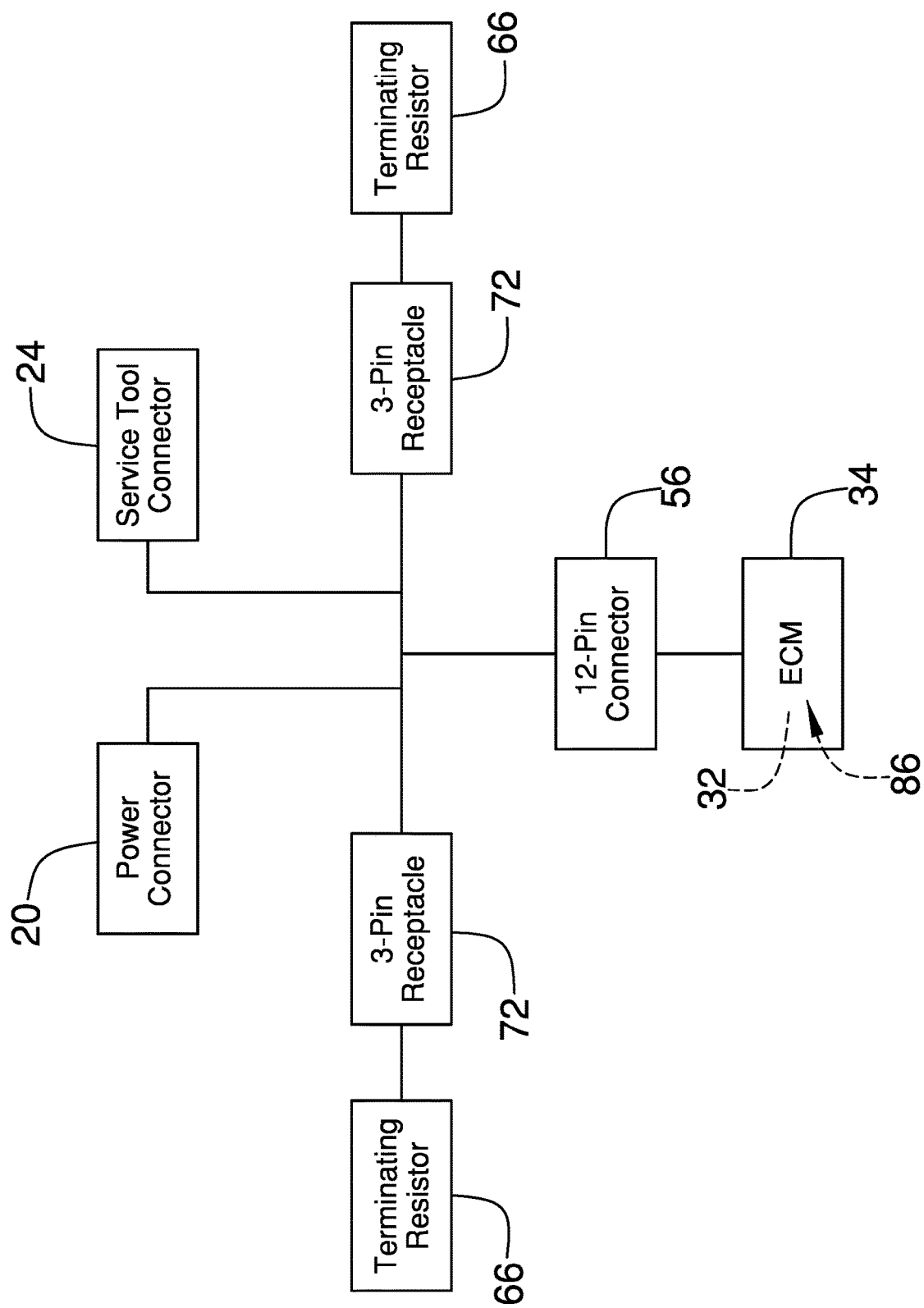
FIG. 7 is a block diagram view of an embodiment of the disclosure.
Figure 8:
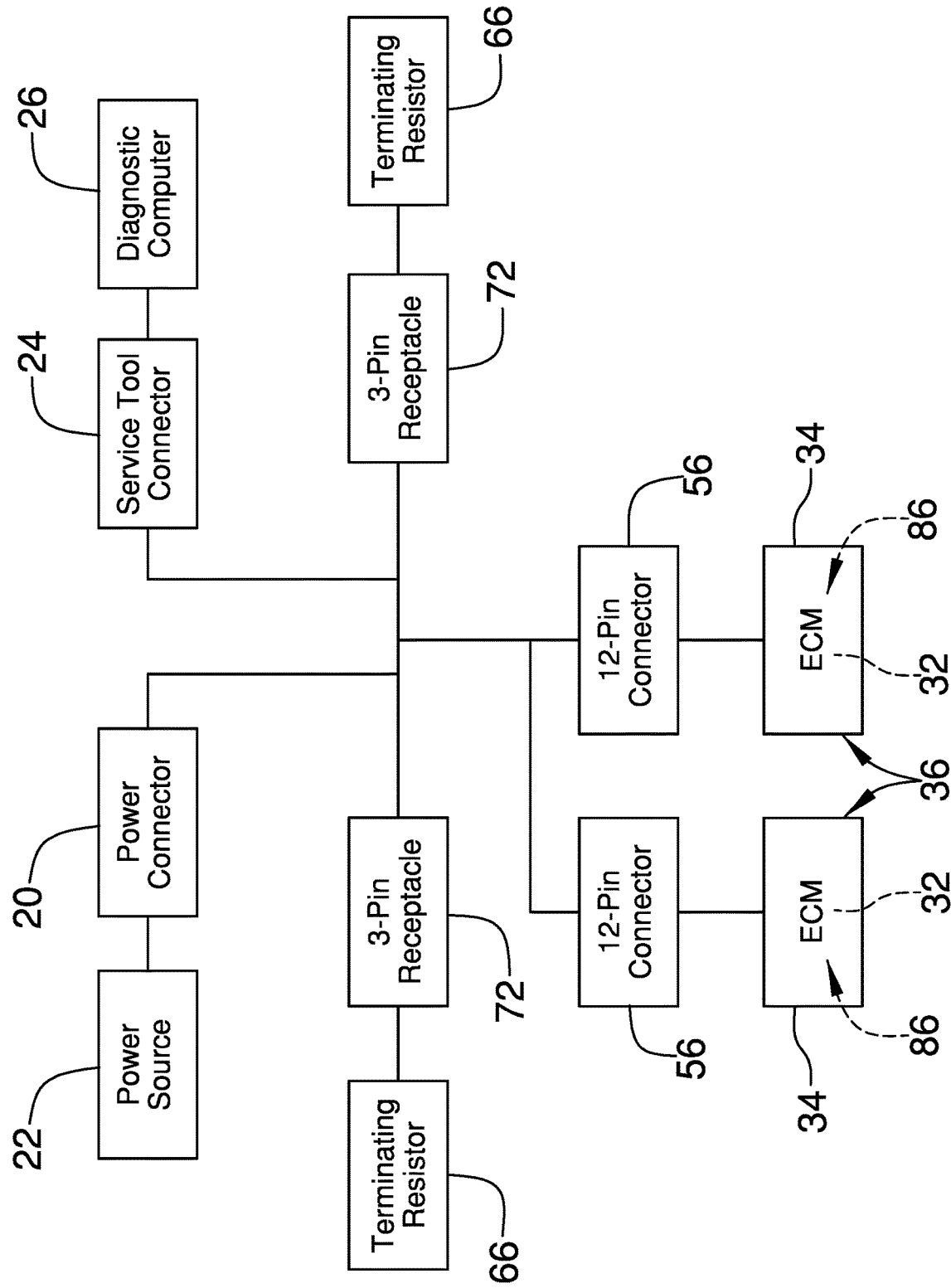
FIG. 8 is a block diagram view of an embodiment of the disclosure.

A service tool connection port 24 is electrically coupled to the ribbon cable 12. The service tool connection port 24 is configured to be electrically couplable to a diagnostic computer 26. For example, the diagnostic computer 26 may be located at an automotive service or repair shop, or may be used by an automotive technician, for troubleshooting and repairing an engine of a vehicle. The service tool connection port 24 may be positioned on the second terminal end 16 of the ribbon cable 12, as shown in FIG. 1. Alternatively, the service tool connection port 24 may extend upwardly from the elongated body 18 of the ribbon cable 12, as shown in FIG. 2. In such embodiments, the service tool connection port 24 may be centrally positioned along the elongated body 18 of the ribbon cable 12, or proximate to a midpoint of the elongated body 18.

A plurality of adaptor plugs 28 is electrically couplable to the ribbon cable 12. Each adaptor plug of the plurality of adaptor plugs 28 may comprise a 12-pin plug 30 that is electrically coupled to an associated engine control module 34 plug 32 of a plurality of engine control module plugs 86 wherein the plurality of adaptor plugs 28 is configured to be electrically couplable to an associated engine control module 34 of a plurality of engine control modules 36. For example, the plurality of engine control modules 36 may be positioned on a diesel engine, such as a CATERPILLAR® diesel engine. Diesel vehicles may include multiple engine control modules 36 within a single vehicle, for example for the transmission and the engine. Different diesel vehicles also typically have different configurations of the plurality of engine control modules 36, which each require a distinctly shaped plug for communicatively coupling each of the plurality of engine control modules 36 to the diagnostic computer 26. The plurality of engine control module plugs 86 enable the plurality of adaptor plugs 28 to couple each distinctly configured or shaped plug of the plurality of engine control modules 36 to the ribbon cable 12, whereby the ribbon cable 12 is configured to enable communication between the plurality of engine control modules 36 and the diagnostic computer 26.

The plurality of engine control module plugs 86 may include a 40-pin DRC series connector plug 38 that is configured to be electrically couplable to a 40-pin DRC series engine control module port. A 40-pin AEC series connector plug 40 is configured to be electrically couplable to a 40-pin AEC series engine control module. A 70-pin connector plug 42 is configured to be electrically couplable to a 70-pin engine control module. A 3-pin connector plug 44 is configured to be electrically couplable to a 3-pin engine control module. A 120-pin connector plug 46 is configured to be electrically couplable to a 120-pin engine control module. A 12-pin connector plug 48 is configured to be electrically couplable to a 12-pin engine control module. An 8-pin connector plug 50 is configured to be electrically couplable to an 8-pin engine control module. A 64-pin connector plug 52 is configured to be electrically couplable to a 64-pin engine control module. A 55-pin connector plug 54 is configured to be electrically couplable to a 55-pin engine control module.

An adaptor port 56 is electrically coupled to the ribbon cable 12. An adaptor plug of the plurality of adaptor plugs 28 is selectively positionable within the adaptor port 56 to electrically couple the adaptor plug of the plurality of adaptor plugs 28 to the ribbon cable 12. The adaptor port 56 generally comprises a 12-pin connector, which is configured to receive the 12-pin plug 30 of each adaptor plug of the plurality of adaptor plugs 28. The adaptor port 56 may be positioned on the first terminal end 14 of the ribbon cable 12, as shown in FIG. 1.

Alternative embodiments may include a plurality of adaptor ports 56 electrically coupled to the ribbon cable 12, as shown in FIG. 2. The plurality of adaptor plugs 28 is selectively positionable within each adaptor port of the plurality of adaptor ports 56 to electrically couple the plurality of adaptor plugs 28 to the ribbon cable 12. For example, each adaptor port of the plurality of adaptor ports 56 generally comprises a 12-pin connector that is configured to receive the 12-pin plug 30 of each adaptor plug of the plurality of adaptor plugs 28. The plurality of adaptor ports 56 may be configured to enable the diagnostic computer 26 to communicate with two or more engine control modules of the plurality of engine control modules 36 simultaneously.

Each of the plurality of adaptor ports 56 may extend downwardly from the elongated body 18 of the ribbon cable 12. For example, a first adaptor port 58 may be positioned proximate to the first terminal end 14 of the ribbon cable 12. A second adaptor port 60 may be positioned adjacent to the first adaptor port 58. The power connection port 20 may be positioned between the first adaptor port 58 and the second adaptor port 60, wherein the power connection port 20 extends upwardly from the elongated body 18. A third adaptor port 62 may be positioned adjacent to the second adaptor port 60. The service tool connection port 24 may be positioned between the second adaptor port 60 and the third adaptor port 62, wherein the service tool connection port 24 extends upwardly from the elongated body 18. A fourth adaptor port 64 may be positioned adjacent to the third adaptor port 62. The fourth adaptor port 64 may be positioned proximate to the second terminal end 16 of the ribbon cable 12.

A pair of terminating resistor plugs 66 is electrically couplable to the ribbon cable 12. The pair of terminating resistor plugs 66 is generally configured to absorb a voltage travelling through the ribbon cable 12 to inhibit the voltage from re-circulating through the ribbon cable 12. For example, if the voltage is not is absorbed by the pair of terminating resistor plugs 66, the voltage may circulate through the ribbon cable 12 at a very fast rate, such as once every four microseconds. The pair of terminating resistor plugs 66 absorb the voltage before the voltage re-circulates so that the user has time to read the data from the plurality of engine control modules 36, or to reprogram the plurality of engine control modules 36, before the voltage re-circulates through the ribbon cable 12. Each terminating resistor plug of the pair of terminating resistor plugs 66 is generally a 3-pin plug 80. For example, the pair of terminating resistor plugs 66 may include a first terminating resistor plug 68 that is configured to absorb a positive voltage and a second terminating resistor plug 70 that is configured to absorb a negative voltage.

A pair of terminating resistor ports 72 is electrically coupled to the ribbon cable 12. Each terminating resistor plug of the pair of terminating resistor plugs 66 is positionable within an associated terminating resistor port of the pair of terminating resistor ports 72 to electrically couple each terminating resistor plug to the ribbon cable 12. Each terminating resistor port of the pair of terminating resistor ports 72 is generally a 3-pin connector, configured to receive the 3-pin plug 80 of each terminating resistor plug.

For example, a first terminating resistor port 74 may extend upwardly from the ribbon cable 12, as shown in FIG. 1. The first terminating resistor port 74 may be positioned adjacent to the first terminal end 14 of the ribbon cable 12. Alternatively, as shown in FIG. 2, the first terminating resistor port 74 may be positioned on the first terminal end 14 of the ribbon cable 12. The first terminating resistor plug 68 is positionable within the first terminating resistor port 74. The second terminating resistor plug 70 may also be positionable within the first terminating resistor port 74.

A second terminating resistor port 76 may extending upwardly from the ribbon cable 12, as shown in FIG. 1. The second terminating resistor port 76 may be positioned adjacent to the first terminating resistor port 74. For example, the first terminating resistor port 74 may be positioned between the first terminal end 14 of the ribbon cable 12 and the second terminating resistor port 76. Alternatively, as shown in FIG. 2, the second terminating resistor port 76 may be positioned on the second terminal end 16 of the ribbon cable 12. The second terminating resistor plug 70 is positionable within the second terminating resistor port 76. The first terminating resistor plug 68 may also be positionable within the second terminating resistor port 76.

An alligator clip adaptor plug 78 may be electrically couplable to one of the pair of terminating resistor ports 72. The alligator clip adaptor plug 78 generally comprises a 3-pin plug 80 that is electrically coupled to a pair of alligator clips 82. The alligator clip adaptor plug 78 is configured to facilitate communication between a vehicle battery and the diagnostic computer 26. For example, the pair of alligator clips 82 may be couplable to a pair of positive and negative terminals on the vehicle battery so that the diagnostic computer 26 can be used to determine whether the vehicle battery has power.

A throttle connection plug 84 may be electrically coupled to the ribbon cable 12. The throttle connection plug 84 may comprise a 3-pin plug 80 wherein the throttle connection plug 84 is configured to receive a 3-pin connector of a throttle control module. The throttle connection plug 84 may be positioned between the power connection port 20 and the second terminating resistor port 76, as shown in FIG. 1. The throttle connection plug 84 may extend upwardly from elongated body 18 of the ribbon cable 12.

In use, the ribbon cable 12 may be configured to facilitate the diagnostic computer 26 in reading data from one or more of the plurality of engine control modules 36 whereby the ribbon cable 12 is configured to facilitate a user in troubleshooting the one or more of the plurality of engine control modules 36. For example, the diagnostic computer 26 can be used to read the data and programming code of the one or more of the plurality of engine control modules 36 to determine the source of performance issues for the diesel engine once the ribbon cable 12 communicatively connects the diagnostic computer 26 to the one or more of the plurality of engine control modules 36.

The ribbon cable 12 may be further configured to facilitate the diagnostic computer 26 in reprogramming the one or more of the plurality of engine control modules 36. For example, the diagnostic computer 26 can flash program the one or more of the plurality of engine control modules 36 to overwrite initialization data or other programming code that may be causing performance issues for the diesel engine, once the ribbon cable 12 communicatively couples the diagnostic computer 26 to the one or more of the plurality of engine control modules 36.

To connect one of the plurality of engine control modules 36 to the diagnostic computer 26, the user can plug the diagnostic computer into the service tool connection port 24. The user can then plug the appropriate adaptor plug of the plurality of adaptor plugs 28 into one of the plurality of adaptor ports 56 and plug the associated engine control module plug 32 into the associated engine control module 34. In embodiments with two or more of the plurality of adaptor ports 56, the user can simultaneously connect the diagnostic computer 26 to multiple engine control modules of the plurality of engine control modules 36. Such embodiments also enable the user to connect to a series of the plurality of engine control modules 36 without needing to remove the associated engine control module plug 32 from the adaptor port 56 when moving between the plurality of engine control modules 36.

Once connected, the user can read the programming code and other diagnostic data from the associated engine control module 34 to troubleshoot the associated engine control module 34. In some embodiments, the user can also flash, or reprogram, the programming code of the associated engine control module 34 to repair the associated engine control module 34. The user only needs a single wire harness device 10 to connect the diagnostic computer 26 to any one of the plurality of engine control modules 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An engine control module connector assembly comprising:
   a ribbon cable;
   a power connection port being electrically coupled to the ribbon cable, the power connection port being configured to be electrically couplable to a power source;
   a service tool connection port being electrically coupled to the ribbon cable, the service tool connection port being configured to be electrically couplable to a diagnostic computer;

a plurality of adaptor plugs being electrically couplable to the ribbon cable, each adaptor plug of the plurality of adaptor plugs comprising a 12-pin plug being electrically coupled to an associated engine control module plug of a plurality of engine control module plugs wherein the plurality of adaptor plugs is configured to be electrically couplable to an associated engine control module of a plurality of engine control modules whereby the ribbon cable is configured to facilitate communication between the plurality of engine control modules and the diagnostic computer;

an adaptor port being electrically coupled to the ribbon cable, an adaptor plug of the plurality of adaptor plugs being selectively positionable within the adaptor port to electrically couple the adaptor plug of the plurality of adaptor plugs to the ribbon cable, the adaptor port comprising a 12-pin connector;

a pair of terminating resistor plugs being electrically couplable to the ribbon cable wherein the pair of terminating resistor plugs is configured to absorb a voltage travelling through the ribbon cable to inhibit the voltage from re-circulating through the ribbon cable; and a pair of terminating resistor ports being electrically coupled to the ribbon cable, each terminating resistor plug of the pair of terminating resistor plugs being positionable within an associated terminating resistor port of the pair of terminating resistor ports to electrically couple each terminating resistor plug to the ribbon cable.

2. The engine control module connector assembly of claim 1, wherein the ribbon cable is configured to facilitate the diagnostic computer in reading data from the associated engine control module whereby the ribbon cable is configured to facilitate a user in troubleshooting the associated engine control module.

3. The engine control module connector assembly of claim 1, wherein the ribbon cable is configured to facilitate the diagnostic computer in reprogramming the associated engine control module.

4. The engine control module connector assembly of claim 1, wherein the adaptor port is positioned on a first terminal end of the ribbon cable and wherein the service tool connection port is positioned on a second terminal end of the ribbon cable.

5. The engine control module connector assembly of claim 4, wherein the pair of terminating resistor plugs is positioned adjacent to the first terminal end of the ribbon cable and wherein the power connection port is positioned adjacent to the second terminal end of the ribbon cable.

6. The engine control module connector assembly of claim 1, further comprising an alligator clip adaptor plug being electrically couplable to one of the pair of terminating resistor ports, the alligator clip adaptor plug comprising a 3-pin plug being electrically coupled to a pair of alligator clips wherein the alligator clip adaptor plug is configured to facilitate communication between a vehicle battery and the diagnostic computer.

7. The engine control module connector assembly of claim 1, further comprising a throttle connection plug being electrically coupled to the ribbon cable, the throttle connection plug comprising a 3-pin plug wherein the throttle connection port is configured to receive a 3-pin connector of a throttle control module.

8. The engine control module connector assembly of claim 1, the plurality of engine control module plugs further comprising:

a 40-pin DRC series connector plug being configured to be electrically couplable to a 40-pin DRC series engine control module port;

a 40-pin AEC series connector plug being configured to be electrically couplable to a 40-pin AEC series engine control module;

a 70-pin connector plug being configured to be electrically couplable to a 70-pin engine control module;

a 3-pin connector plug being configured to be electrically couplable to a 3-pin engine control module;

a 120-pin connector plug being configured to be electrically couplable to a 120-pin engine control module;

a 12-pin connector plug being configured to be electrically couplable to a 12-pin engine control module;

an 8-pin connector plug being configured to be electrically couplable to an 8-pin engine control module;

a 64-pin connector plug being configured to be electrically couplable to a 64-pin engine control module; and a 55-pin connector plug being configured to be electrically couplable to a 55-pin engine control module.

9. The engine control module connector assembly of claim 1, the adaptor port further comprising a plurality of adaptor ports wherein the plurality of adaptor ports is configured to enable the diagnostic computer to communicate with two or more engine control modules of the plurality of engine control modules simultaneously.

10. The engine control module connector assembly of claim 9, the plurality of adaptor ports further comprising:

a first adaptor port being positioned proximate to a first terminal end of the ribbon cable;

a second adaptor port being positioned adjacent to the first adaptor port, the power connection port being positioned between the first adaptor port and the second adaptor port;

a third adaptor port being positioned adjacent to the second adaptor port, the service tool connection port being positioned between the second adaptor port and the third adaptor port; and a fourth adaptor port being positioned adjacent to the third adaptor port, the fourth adaptor port being positioned proximate to a second terminal end of the ribbon cable.

11. The engine control module connector assembly of claim 10, wherein a first terminating resistor port of the pair of terminating resistor ports is positioned on the first terminal end of the ribbon cable and wherein a second terminating resistor port of the plurality of terminating resistor ports is positioned on the second terminal end of the ribbon cable.

12. The engine control module connector assembly of claim 11, wherein the power connection port and the service tool connection port extend upwardly from the ribbon cable and wherein the plurality of adaptor ports extend downwardly from the ribbon cable.

13. An engine control module connector assembly comprising:

a ribbon cable having a first terminal end, a second terminal end, and an elongated body extending between the first terminal end and the second terminal end;

a power connection port being electrically coupled to the ribbon cable, the power connection port being configured to be electrically couplable to a power source, the power connection port being a 3-pin connector, the power connection port extending upwardly from the elongated body of the ribbon cable, the power connection port being positioned proximate to the second terminal end;

a service tool connection port being electrically coupled to the ribbon cable, the service tool connection port being configured to be electrically couplable to a diagnostic computer, the service tool connection port extending upwardly from the elongated body of the ribbon cable, the service tool connection port being centrally positioned along the elongated body of the ribbon cable;

a plurality of adaptor plugs being electrically couplable to the ribbon cable, each adaptor plug of the plurality of adaptor plugs comprising a 12-pin plug being electrically coupled to an associated engine control module plug of a plurality of engine control module plugs wherein the plurality of adaptor plugs is configured to be electrically couplable to an associated engine control module of a plurality of engine control modules whereby the ribbon cable is configured to enable communication between the plurality of engine control modules and the diagnostic computer, the plurality of engine control module plugs including:

a 40-pin DRC series connector plug being configured to be electrically couplable to a 40-pin DRC series engine control module port;

a 40-pin AEC series connector plug being configured to be electrically couplable to a 40-pin AEC series engine control module;

a 70-pin connector plug being configured to be electrically couplable to a 70-pin engine control module;

a 3-pin connector plug being configured to be electrically couplable to a 3-pin engine control module;

a 120-pin connector plug being configured to be electrically couplable to a 120-pin engine control module;

a 12-pin connector plug being configured to be electrically couplable to a 12-pin engine control module;

an 8-pin connector plug being configured to be electrically couplable to an 8-pin engine control module;

a 64-pin connector plug being configured to be electrically couplable to a 64-pin engine control module;

a 55-pin connector plug being configured to be electrically couplable to a 55-pin engine control module;

a plurality of adaptor ports being electrically coupled to the ribbon cable, the plurality of adaptor plugs being selectively positionable within each adaptor port of the plurality of adaptor ports to electrically couple the plurality of adaptor plugs to the ribbon cable, each of the plurality of adaptor ports extending downwardly from the elongated body of the ribbon cable, each adaptor port of the plurality of adaptor ports comprising a 12-pin connector, the plurality of adaptor ports including:

a first adaptor port being positioned proximate to the first terminal end of the ribbon cable;

a second adaptor port being positioned adjacent to the first adaptor port, the power connection port being positioned between the first adaptor port and the second adaptor port;

a third adaptor port being positioned adjacent to the second adaptor port, the service tool connection port being positioned between the second adaptor port and the third adaptor port;

a fourth adaptor port being positioned adjacent to the third adaptor port, the fourth adaptor port being positioned proximate to the second terminal end of the ribbon cable;

wherein the plurality of adaptor ports is configured to enable the diagnostic computer to communicate with two or more engine control modules of the plurality of engine control modules simultaneously;

a pair of terminating resistor plugs being electrically couplable to the ribbon cable wherein the pair of terminating resistor plugs is configured to absorb a voltage travelling through the ribbon cable to inhibit the voltage from re-circulating through the ribbon cable, each terminating resistor plug of the pair of terminating resistor plugs being a 3-pin plug, the pair of terminating resistor plugs including:

a first terminating resistor plug being configured to absorb a positive voltage;

a second terminating resistor plug being configured to absorb a negative voltage;

a pair of terminating resistor ports being electrically coupled to the ribbon cable, each terminating resistor plug of the pair of terminating resistor plugs being positionable within an associated terminating resistor port of the pair of terminating resistor ports to electrically couple each terminating resistor plug to the ribbon cable, each terminating resistor port of the pair of terminating resistor ports being a 3-pin connector, the pair of terminating resistor ports including:

a first terminating resistor port being positioned on the first terminal end of the ribbon cable, the first terminating resistor plug being positionable within the first terminating resistor port;

a second terminating resistor port being positioned on the second terminal end of the ribbon cable, the second terminating resistor plug being positionable within the second terminating resistor port;

an alligator clip adaptor plug being electrically couplable to one of the pair of terminating resistor ports, the alligator clip adaptor plug comprising a 3-pin plug being electrically coupled to a pair of alligator clips wherein the alligator clip adaptor plug is configured to facilitate communication between a vehicle battery and the diagnostic computer;

a throttle connection plug being electrically coupled to the ribbon cable, the throttle connection plug comprising a 3-pin plug wherein the throttle connection port is configured to receive a 3-pin connector of a throttle control module, the throttle connection plug extending upwardly from elongated body of the ribbon cable;

wherein the ribbon cable is configured to facilitate the diagnostic computer in reading data from one or more of the plurality of engine control modules whereby the ribbon cable is configured to facilitate a user in troubleshooting the one or more of the plurality of engine control modules; and wherein the ribbon cable is configured to facilitate the diagnostic computer in reprogramming the one or more of the plurality of engine control modules.

* * * * *